United States Patent
Kim et al.

(10) Patent No.: US 11,430,278 B2
(45) Date of Patent: Aug. 30, 2022

(54) BUILDING MANAGEMENT ROBOT AND METHOD OF PROVIDING SERVICE USING THE SAME

(71) Applicant: LG ELECTRONICS INC., Seoul (KR)

(72) Inventors: Hyongguk Kim, Seoul (KR); Jaeyoung Kim, Seoul (KR); Hyoungmi Kim, Seoul (KR); Yujune Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 572 days.

(21) Appl. No.: 16/486,717

(22) PCT Filed: Jun. 21, 2019

(86) PCT No.: PCT/KR2019/007539
§ 371 (c)(1),
(2) Date: Aug. 16, 2019

(87) PCT Pub. No.: WO2020/256195
PCT Pub. Date: Dec. 24, 2020

(65) Prior Publication Data
US 2022/0005303 A1 Jan. 6, 2022

(51) Int. Cl.
*G05B 15/00* (2006.01)
*G07C 9/25* (2020.01)
(Continued)

(52) U.S. Cl.
CPC .............. *G07C 9/253* (2020.01); *B66B 1/468* (2013.01); *G06V 20/20* (2022.01); *G06V 20/52* (2022.01);
(Continued)

(58) Field of Classification Search
CPC ..... G07C 9/253; G07C 9/00904; B66B 1/468; B66B 1/3461; B66B 5/0012;
(Continued)

(56) References Cited

U.S. PATENT DOCUMENTS

| 10,347,063 | B1* | 7/2019 | LaRovere | G07C 9/00571 |
| 2008/0294287 | A1* | 11/2008 | Kawano | G05B 19/4189 |
| | | | | 901/1 |
| 2015/0109128 | A1* | 4/2015 | Fadell | G08B 25/008 |
| | | | | 340/540 |
| 2015/0156030 | A1* | 6/2015 | Fadell | G08B 25/008 |
| | | | | 700/90 |

(Continued)

FOREIGN PATENT DOCUMENTS

| CN | 108529360 | | 9/2018 | |
| CN | 108529360 | A * | 9/2018 | ............... B66B 1/14 |

(Continued)

OTHER PUBLICATIONS

PCT International Application No. PCT/KR2019/007539, Written Opinion of the International Searching Authority dated Mar. 19, 2020, 10 pages.

*Primary Examiner* — Mahendra R Patel
(74) *Attorney, Agent, or Firm* — Lee, Hong, Degerman, Kang & Waimey PC

(57) ABSTRACT

A building management robot includes a communication unit configured to recognize an identification device corresponding to a first divided space among at least one divided space in a building and acquire first identification information of the first divided space from the identification device, a camera configured to acquire image data including a position where the identification device is recognized, and a processor configured to recognize a user from the image data, confirm an authentication level of the first divided space of the recognized user from a database, and provide the user with a service based on the confirmed authentication level.

16 Claims, 10 Drawing Sheets

(51) Int. Cl.
*G06V 20/20* (2022.01)
*G06V 20/52* (2022.01)
*G06V 40/16* (2022.01)
*G06V 40/60* (2022.01)
*B66B 1/46* (2006.01)
*B66B 1/34* (2006.01)
*B66B 5/00* (2006.01)

(52) U.S. Cl.
CPC ............ *G06V 40/168* (2022.01); *G06V 40/67* (2022.01); *B66B 1/3461* (2013.01); *B66B 5/0012* (2013.01); *B66B 2201/4653* (2013.01)

(58) Field of Classification Search
CPC ............ B66B 2201/4653; G06V 20/20; G06V 20/52; G06V 40/168; G06V 40/67; G06V 10/764; G06V 40/103; G06V 10/82; B25J 11/008; B25J 9/161; B25J 9/1664; B25J 9/1679; B25J 13/08; B25J 19/023
USPC ........................................................ 700/258
See application file for complete search history.

(56) References Cited

U.S. PATENT DOCUMENTS

| | | | |
|---|---|---|---|
| 2017/0108236 A1* | 4/2017 | Guan | G05B 15/02 |
| 2017/0225336 A1* | 8/2017 | Deyle | B25J 5/007 |
| 2018/0204111 A1* | 7/2018 | Zadeh | G06N 3/0436 |
| 2019/0087646 A1* | 3/2019 | Goulden | G08B 13/19656 |
| 2019/0172284 A1* | 6/2019 | Herget | G07C 9/00 |

FOREIGN PATENT DOCUMENTS

| | | | | |
|---|---|---|---|---|
| CN | 109689174 B | * | 12/2020 | ............ A63H 11/00 |
| EP | 3496053 | | 6/2019 | |
| EP | 3900885 A1 | * | 10/2021 | ............ B25J 11/008 |
| JP | 2005022029 A | * | 1/2005 | ............ E05F 15/71 |
| JP | 2005053670 | | 3/2005 | |
| JP | 2005053670 A | * | 3/2005 | |
| JP | 2008065763 A | * | 3/2008 | ......... G06Q 20/0457 |
| JP | 2019052027 | | 4/2019 | |
| KR | 1020110016691 | | 2/2011 | |
| WO | WO-2020131101 A1 | * | 6/2020 | ............ E05F 15/71 |

* cited by examiner

BUILDING MANAGEMENT ROBOT AND METHOD OF PROVIDING SERVICE USING THE SAME

CROSS-REFERENCE TO RELATED APPLICATIONS

This application is the National Stage filing under 35 U.S.C. 371 of International Application No. PCT/KR2019/007539, filed on Jun. 21, 2019, the contents of which are hereby incorporated by reference herein in its entirety.

FIELD

The present invention relates to a building management robot and, more particularly, to a building management robot capable of providing various services to persons who live in or use a building.

BACKGROUND

A robot may refer to a machine that automatically processes or operates a given task by its own ability. Robot application fields may be generally classified into various fields including an industrial field, a medical field, an aerospace field and an ocean field.

Recently, with development of self-driving technology, automatic control technology using sensors and communication technology, research into application of robots to various fields is ongoing.

For example, a building management robot that is disposed in a building such as an apartment, an efficiency apartment, a hotel, a business building, etc. to perform various management operations related to the above-described building may be considered. For example, the building management robot may perform security operation, guard assistance operation, parking lot management, cleaning operation, etc. while traveling at the inside/outside of the building. Alternatively, the building management robot may provide each unit of an apartment with a visiting service or various services such as a parcel delivery service or a mail delivery service.

Meanwhile, various persons may exist in a building in which a building management robot is disposed. Such persons include a person authorized to use a specific space (a unit number of an apartment, a hotel room, etc.) of the building and a persons which is not authorized to use a specific space, such as a visitor. If a building management robot capable of providing an efficient management and customized services to such various people is implemented, diffusion of the building management robot may increase.

SUMMARY

An object of the present invention devised to solve the problem lies in a building management robot capable of recognizing and authenticating various persons who use a building and providing various customized services according to the result of authentication, and a method of providing a service using the same.

Another object of the present invention devised to solve the problem lies in a building management robot capable of minimizing user inconvenience when a user rides in an elevator provided in a building or efficiently protecting the user, and a method of providing a service using the same.

A building management robot according to an embodiment of the present invention includes a communication unit configured to recognize an identification device corresponding to a first divided space among at least one divided space in a building and acquire first identification information of the first divided space from the identification device, a camera configured to acquire image data including a position where the identification device is recognized, and a processor configured to recognize a user from the image data, confirm an authentication level of the first divided space of the recognized user from a database, and provide the user with a service based on the confirmed authentication level.

In some embodiments, the communication unit may include at least two wireless communication modules spaced apart from in the building management robot, and the processor may detect a position or direction of the identification device based on a difference in intensity or time between signals respectively received from the identification device through the at least two wireless communication modules, control a traveling unit or a camera direction adjustment mechanism to face the detected position or direction, and control the camera to acquire the image data.

The processor may extract an area including the user from the image data, acquire image feature data of the user from the extracted area, and acquire the authentication level included in a record having the image feature data and the first identification information of the first divided space from the database.

In some embodiments, the building management robot may further include a memory configured to store a recognition model learned by a learning processor, and the processor may recognize the user from the image data through the recognition model stored in the memory.

In some embodiments, the processor may transmit a visitor notification to a management apparatus of the first divided space, when the authentication level is less than a reference level.

In some embodiments, the processor may transmit a request for opening an entrance of the building to an entrance management apparatus or a request for calling an elevator to an elevator management apparatus of the building, when the authentication level is equal to or greater than the reference level.

The processor may store a first record including feature data of the user acquired from the image data, the first identification information of the first divided space and the authentication level in the database, when information on the user matching the first divided space is not present in the database.

The processor may increase the authentication level included in the first record, when the number of times of acquiring the first identification information and the feature data of the user is equal to or greater than predetermined value.

The processor may recognize an elevator boarding situation for movement to a second divided space among the at least one divided space, receive first image data including the inside of an elevator from an elevator management apparatus or a server, detect whether a person riding in the elevator is present from the received first image data, and transmit a request for calling the elevator to the elevator management apparatus or the server when the person riding in the elevator is not present.

The processor may receive at least one second image data including an elevator boarding area of at least one floor in the building from the elevator management apparatus or the server, detect whether a person waiting for use of the elevator is present from the received at least one second image data, and transmit a request for calling the elevator to the elevator management apparatus or the server when the person waiting for use of the elevator is not present.

The processor may transmit a request for calling an elevator to an elevator management apparatus or a server based on the first identification information, and determine whether the robot rides in the elevator based on characteristics of the user, and the characteristics of the user may include at least one of gender, age range, disability and impaired mobility.

The processor may control a traveling unit such that the robot gets off the elevator together with the user when the robot rides in the elevator together with the user, and perform at least one of first operation of controlling the camera to acquire image data including the user and second operation of controlling the traveling unit to travel according to movement of the user.

In some embodiments, the processor may receive image data including the inside of the elevator from the elevator management apparatus or the server, identify another person in the elevator from the received image data, and determine whether the robot rides in the elevator based on a result of identifying the other person.

A method of providing a service using a building management robot according to another embodiment includes recognizing an identification device corresponding to a first divided space among at least one divided space in a building, acquiring image data including a position where the identification device is recognized, recognizing a user from the acquired image data, confirming an authentication level of the first divided space of the recognized user from a database, and providing the user with a service based on the confirmed authentication level.

DETAILED DESCRIPTION

Figure 1:
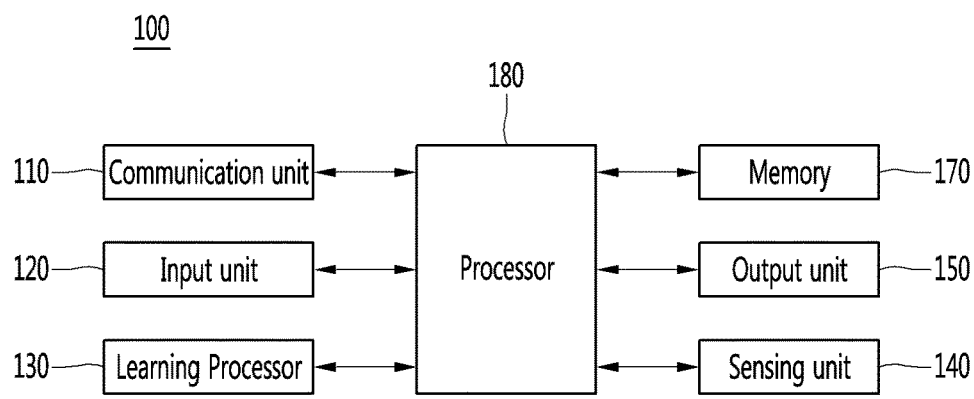
FIG. 1 is a diagram showing an artificial intelligence (AI) device including a robot according to an embodiment of the present invention.

Hereinafter, embodiments disclosed in this specification will be described with reference to the accompanying drawings. The accompanying drawings are used to help easily understand the embodiments disclosed in this specification and it should be understood that the technical ideas disclosed in this specification are not limited by the accompanying drawings and include all alterations, equivalents and substitutes within the spirit and scope of the present invention.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
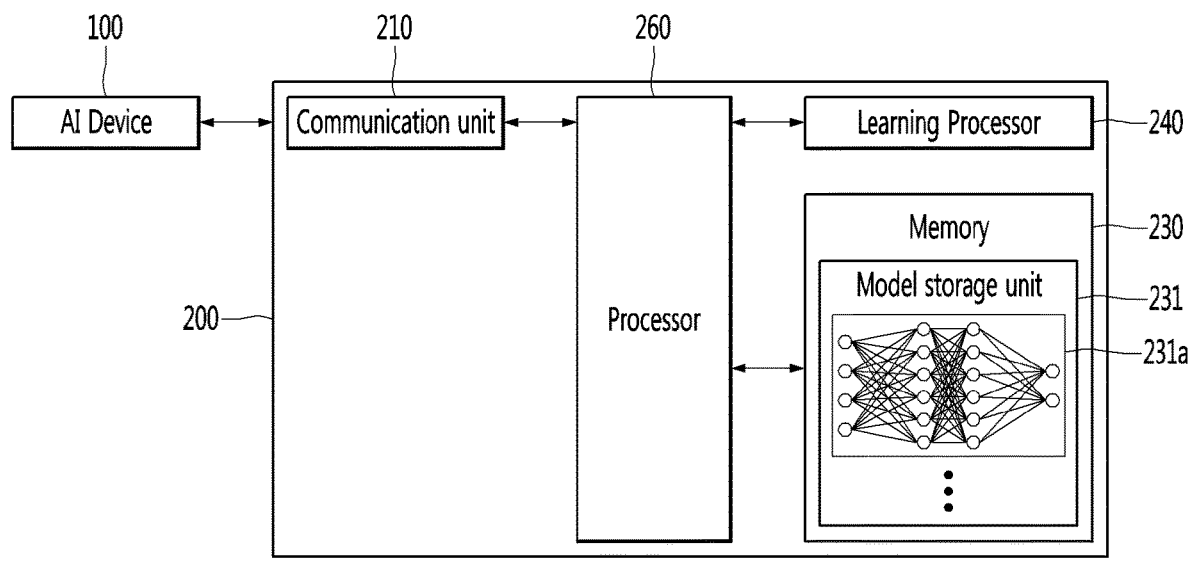
FIG. 2 is a diagram showing an AI server connected to a robot according to an embodiment of the present invention.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
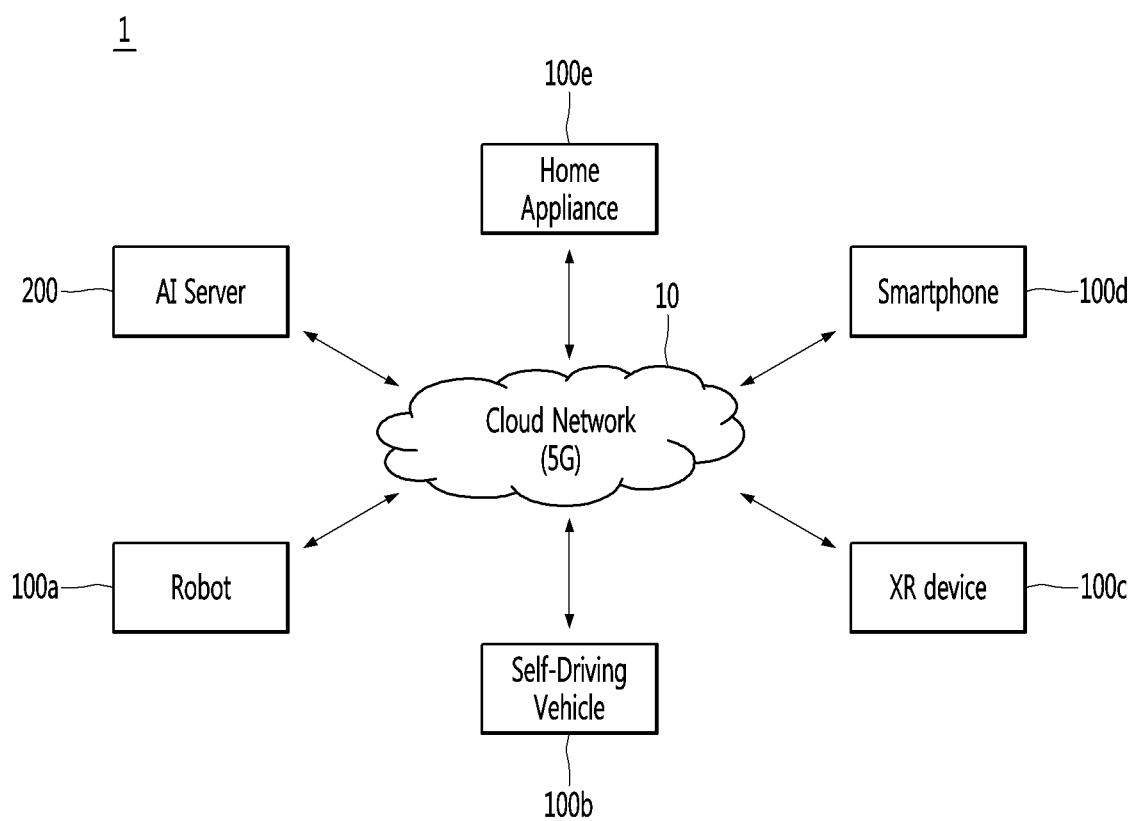
FIG. 3 is a diagram showing an AI system including a robot according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Figure 4:
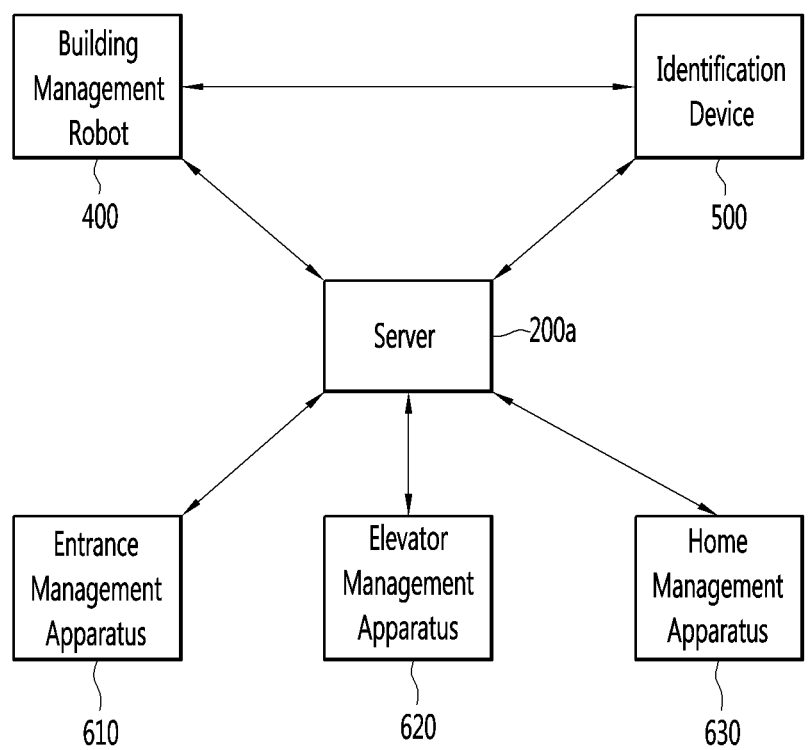
FIG. 4 is a diagram illustrating the concept of a building management robot according to an embodiment of the present invention and a building management system including the same.

FIG. 4 is a diagram illustrating the concept of a building management robot according to an embodiment of the present invention and a building management system including the same.

Hereinafter, in this specification, assume that a building to which a building management robot and a building management system are applied is an apartment. However, the building management robot and the building management system are applicable to various buildings such as multi-unit dwellings other than the apartments or commercial buildings such as hotels or efficiency apartments.

Referring to FIG. 4, the building management system may include a building management robot 400, a server 200a, an entrance management apparatus 610, an elevator management apparatus 620 and a home management apparatus 630. The components included in the building management system are not limited to FIG. 4 and the building management system may include more or fewer components than the components shown in FIG. 4.

The building management robot 400 may perform various operations related to building management while traveling in an inner area of a building or an outer area within a predetermined distance from the building (hereinafter referred to as the inside/outside of the building).

For example, the building management robot 400 may perform security operation, guard assistance operation, parking lot management, cleaning operation, etc. while traveling at the inside/outside of the building.

Alternatively, the building management robot 400 may provide various services such as visiting services or parcel or mail services to units of the apartment.

In particular, the building management robot 400 according to the embodiment of the present invention may recognize a person located inside/outside the building or a person who tries to enter the building and determine a service to be provided to the person according to the result of recognition. Embodiments related thereto will be described below with reference to FIGS. 6 to 16.

The server 200*a* may perform overall management of the building management system. For example, the server 200*a* may be operated by a provider of the building management system or may be implemented by at least one computing device provided in the building according to embodiments.

The server 200*a* may be connected to the building management robot 400 and various apparatuses 500, 610, 620 and 630 located in the building to transmit and receive a variety of information and data or to control operation of the connected apparatuses 400, 610, 620 and 630. Meanwhile, the apparatuses 400, 500, 610, 620 and 630 excluding the server 200*a* may communicate with each other through the server 200*a* or directly according to some embodiments.

The server 200*a* or the building management robot 400 may include an algorithm and database for recognizing and identifying persons who use the building.

In addition, the server 200*a* or the building management robot 400 may manage users (residents, guests, employees, etc.) corresponding to a plurality of divided spaces (unit numbers of an apartment, hotel rooms, etc.) included in the building through the database. For example, the database may determine whether a person recognized to correspond to any one of the divided spaces is authorized to enter or use the divided space according to an authentication level. This will be described below with reference to FIGS. 6 to 8.

Meanwhile, operation of recognizing the person and operation of determining a service to be provided based on the result of recognition at the building management robot 400 may be performed by the server 200*a*. In this case, the building management robot 400 may transmit data (video, audio, etc.) for recognizing a person to the server 200*a*, and the server 200*a* may recognize the person from the received data and determine a service to be provided based on the result of recognition. The server 200*a* may transmit information or a command related to the determined service to the building management robot 400 and the building management robot 400 may provide the determined service to the recognized person.

Meanwhile, the server 200*a* may be implemented as the AI server 200 described with reference to FIG. 2. That is, the components of the AI server 200 described with reference to FIG. 2 and the description thereof are equally applicable to the server 200*a* of FIG. 4.

The identification device 500 may correspond to one of the plurality of divided spaces included in the building. For example, if the building is an apartment, the identification device 500 may be implemented as a smart key corresponding to a particular unit of the apartment.

The identification device 500 may include identification information of the particular divided space, security information for locking or unlocking the divided space, etc. If the building is an apartment, the identification device 500 may include identification information of a unit number corresponding thereto and security information (password, etc.) for locking or unlocking the divided space corresponding to the unit number.

The identification device 500 may include a short-range wireless communication module. For example, the identification device 500 may communicate with the components 200*a*, 400, 610, 620 and 630 included in the building management system according to the short-range wireless communication method such as Bluetooth®, BLE (Bluetooth Low Energy), NFC (near field communication), UWB (ultra wideband), ZigBee, etc.

The entrance management apparatus 610 may manage operation of opening and closing the entrance of the building. For example, the entrance management apparatus 610 may acquire identification information or security information from the identification device 500 when the identification device 500 is located within a predetermined distance. The entrance management apparatus 610 or the server 200*a* may determine whether the acquired identification information or security information has been registered in the database of the building management system. When the acquired identification information or security information has been registered in the database, the entrance management apparatus 610 may open the entrance of the building.

The elevator management apparatus 620 may manage operation of an elevator provided in the building. For example, the elevator management apparatus 620 may control operation of lifting up or down the elevator, operation of opening and closing a door, etc. In some embodiments, a camera device (CCTV, etc.) may be provided in the elevator and the elevator management apparatus 620 may transmit video data acquired through the camera device to the server 200*a*.

Meanwhile, in some embodiments, at least one components and functions of the entrance management apparatus 610 and the elevator management apparatus 620 may be integrated in the server 200*a*.

The home management apparatus 630 may be provided in each divided space to manage the divided space. The home management apparatus 630 may perform various management operations related to the divided space, such as door opening/closing operation of the divided space, power supply control in the divided space, monitoring the inside of the divided space, etc.

For example, the home management apparatus 630 may include a door lock device provided in the door. The door lock device may acquire identification information or security information from the identification device 500 when the identification device 500 corresponding to the divided space is within a predetermined distance. The door lock device may unlock the door when the acquired identification information or security information matches identification information or security information corresponding to the divided space.

In addition, the building management system may further include various components according to the type or characteristics of the building.

Hereinafter, the configuration of the building management robot 400 according to the embodiment of the present invention and embodiments of various building management operations provided through the building management robot 400 will be described.

Figure 5:
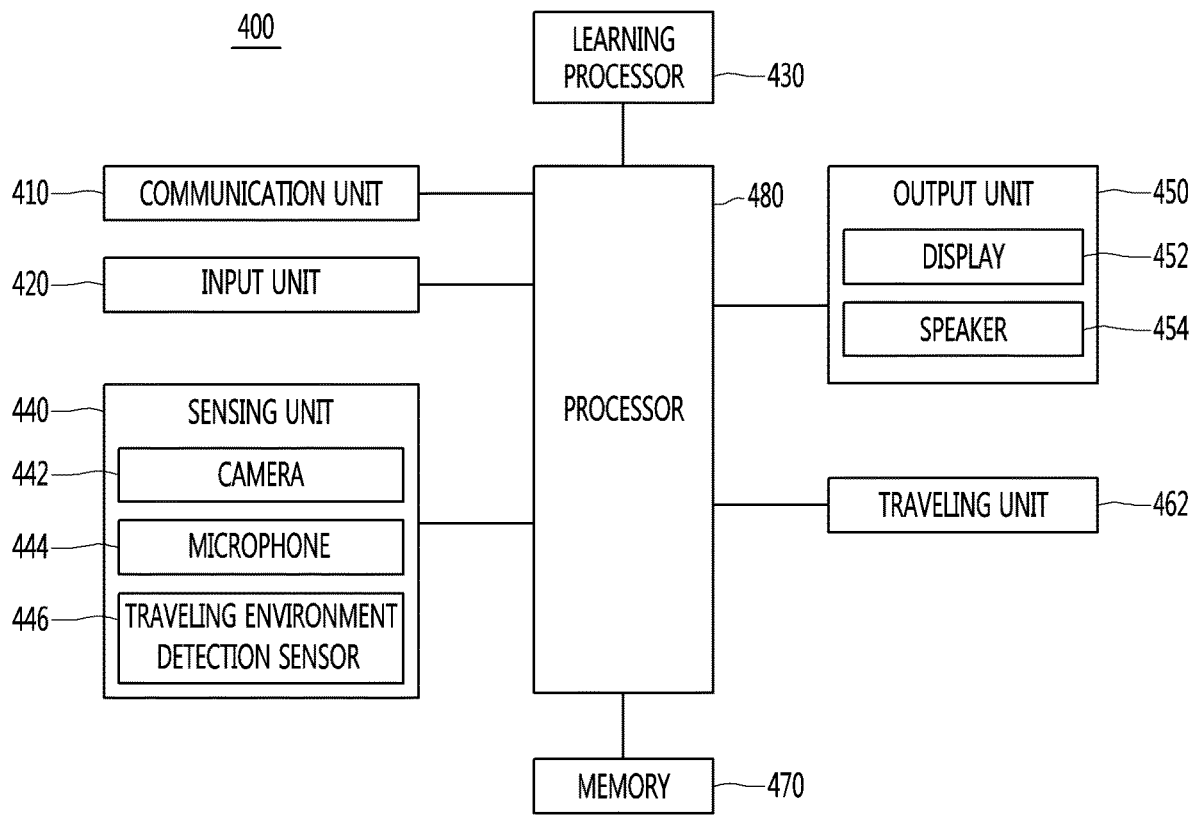
FIG. 5 is a block diagram showing the control configuration of a building management robot according to an embodiment of the present invention.

FIG. 5 is a block diagram showing the control configuration of a building management robot according to an embodiment of the present invention.

Referring to FIG. 5, the building management robot 400 according to the embodiment of the present invention may include a communication unit 410, an input unit 420, a sensing unit 440, an output unit 450, a traveling unit 462, a memory 470 and a processor 480. The components shown in FIG. 5 are an example for convenience of description and the building management robot 400 may include more or fewer components than FIG. 5.

Meanwhile, the building management robot 400 may correspond to the examples of the AI device 100 described above with reference to FIG. 1. In this case, the description of the components described above with reference to FIG. 1 is equally applicable to the corresponding components of the building management robot 400.

The communication unit 410 may include communication modules for connecting the building management robot 400 with the server 200a, the identification device 500, and the other apparatuses 610, 620 and 630 over a network. Each of the communication modules may support any one of the communication technologies described above with reference to FIG. 1.

For example, the building management robot 400 may be connected to the network through an access point such as a router. Therefore, the building management robot 400 may provide a variety of information and/or data acquired through the input unit 420 or the sensing unit 440 to the server 200a over the network.

Meanwhile, the communication unit 410 may recognize the identification device 500 within a predetermined distance from the building management robot 400 using the short-range wireless communication module (Bluetooth, BLE, NFC, etc.). In some embodiments, the building management robot 400 may include at least two short-range wireless communication modules spaced apart from each other. In this case, the processor 480 may detect the direction and/or position of the identification device 500 recognized through the at least two short-range wireless communication modules.

The input unit 420 may include at least one input portion for acquiring various types of data. For example, the at least one input portion may include a physical input portion such as a button or a dial or a touch input unit such as a touch pad or a touch panel. A user may input various requests or commands to the building management robot 400 through the input unit 420.

The sensing unit 440 may include at least one sensor for sensing a variety of information around the building management robot 400. For example, the sensing unit 440 may include a camera 442, a microphone 444 and a traveling environment detection sensor 446.

The camera 442 may acquire the image of the periphery of the building management robot 400. For example, the building management robot 400 may include at least one camera 442 and the at least one camera 442 may be implemented as a stereo camera, a 2D camera, an infrared camera, etc.

The microphone 444 may detect sound (human voice, sound generated by a specific object, etc.) around the building management robot 400.

For example, the processor 480 may acquire image data including a person's face through the camera 442 and recognize the person based on the acquired image data. Alternatively, the processor 480 may transmit the acquired image data to the server 200a through the communication unit 410, and the server 200a may recognize the person based on the received image data.

In some embodiments, the processor 480 may acquire voice data including the voice of the person through the microphone 444 and recognize the person using the acquired voice data.

Meanwhile, the server 200a may be implemented as the AI server 200 described above with reference to FIG. 2. In this case, the server 200a may recognize the person from the image data and/or the voice data through the model (artificial neural network 231a) learned through the learning processor 240.

In some embodiments, the processor 480 may recognize the person from the image data and/or the voice data through the model learned by the learning processor 430 in the building management robot 400. Alternatively, the processor 480 may receive data corresponding to the learned model from the server 200a, store the data in the memory 470, and recognize the person from the image data and/or the voice data through the stored data.

The traveling environment detection sensor 446 may include at least one sensor for detecting an obstacle around the building management robot 400, an obstacle located on a floor, a step of a floor, etc., for stable traveling of the building management robot 400. For example, the traveling environment detection sensor 446 may include a camera, an ultrasonic sensor, a proximity sensor, etc.

The processor 480 may control the traveling direction or traveling speed of the building management robot 400 based on the sensing value of the traveling environment detection sensor 446. For example, the processor 480 may detect an obstacle located ahead based on the sensing value, set or change a traveling route based on the detected obstacle, and control the traveling unit 462 (e.g., a traveling motor) based on the set or changed traveling route.

In some embodiments, some components (e.g., a camera, a microphone, etc.) included in the sensing unit 440 may function as the input unit 420.

The output unit 450 may output a variety of information related to the operation or state of the building management robot 400 or various services, programs, applications, etc. executed in the building management robot 400.

For example, the output unit 450 may include a display 452 and a speaker 454.

The display 452 may output the variety of information or messages in the form of a graphic. In some embodiments, the display 452 may be implemented in the form of a touchscreen along with a touch input unit. In this case, the display 452 may function as an output unit and an input unit. The speaker 454 may output the variety of information or messages in the form of voice or sound. In some embodiments, the processor 480 may support video call between a person around the robot and a security guard of a security office or a resident of a specific divided space using the output unit 450.

In some embodiments, the output unit 450 may be attached to and detached from the building management robot 400 at a predetermined position in the form of a terminal.

The traveling unit 462 is used for movement (traveling) of the building management robot 400 and may include, for example, a traveling motor. The traveling motor may be connected to at least one wheels provided at the lower portion of the building management robot 400 to provide driving force of the building management robot 400 to the wheel. For example, the traveling unit 462 may include at least one traveling motor and the processor 480 may control the at least one traveling motor to adjust the traveling direction and/or the traveling speed.

The memory 470 may store a variety of data such as control data for controlling operation of the components included in the building management robot 400, data for performing operation based on input acquired through the input unit 420 or information acquired through the sensing unit 440, etc.

In addition, the memory 470 may store program data of a software module or an application executed by at least one processor or controller included in the processor 480.

In addition, the memory 470 according to the embodiment of the present invention may store a recognition algorithm for recognizing a person from the image data including the person acquired through the camera 442 and/or the voice data of the person acquired through the microphone 422. The memory 470 may further include a database for identifying the recognized person or determining whether the recognized person is a person (a resident, a guest, etc.) who is authorized to enter or use a predetermined divided space in the building.

In addition, the memory 470 may store an algorithm for adjusting the traveling speed or the traveling direction based on the sensing value acquired through the traveling environment detection sensor 446.

The memory 470 may include various storage devices such as a ROM, a RAM, an EEPROM, a flash drive, a hard drive, etc. in hardware.

The processor 480 may include at least one processor or controller for controlling operation of the building management robot 400. Specifically, the processor 480 may include at least one CPU, AP (application processor), microcomputer, integrated circuit, ASIC (application specific integrated circuit), etc.

The processor 480 may control overall operation of the components included in the building management robot 400. In addition, the processor 480 may include an image signal processor (ISP) for processing the image signal acquired through the camera 442 and generating image data, a display controller for controlling operation of the display 452, etc.

Hereinafter, operation of the building management robot 400 according to the embodiment of the present invention and the building management system including the same will be described in greater detail with reference to FIGS. 6 to 16.

Figure 6:
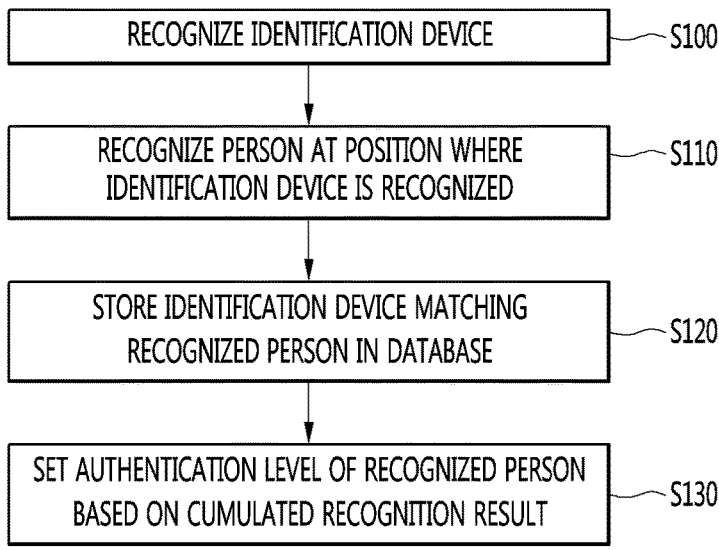
FIG. 6 is a flowchart illustrating operation of registering and managing a recognized person at a building management robot according to an embodiment of the present invention.

FIG. 6 is a flowchart illustrating operation of registering and managing a recognized person at a building management robot according to an embodiment of the present invention.

Referring to FIG. 6, the building management robot 400 may recognize the identification device 500 (S100).

The building management robot 400 may perform various operations or provide services in a state of traveling at the inside/outside of the building or being stopped at a predetermined position inside/outside the building.

The processor 480 may detect presence of the identification device 500 through the communication unit 410, when the identification device 500 approaches the building management robot 400 within a predetermined distance.

For example, the short-range wireless communication module included in the communication unit 410 may periodically output a signal for detecting the identification device 500. The identification device 500 may receive the signal and output a response to the received signal, when being located within the predetermined distance from the building management robot 400. The response may include the identification information stored in the identification device 500, without being limited thereto.

The processor 480 may receive the response through the communication unit 410, thereby detecting presence of the identification device 500. In addition, when the identification information of the identification device 500 is included in the response, the processor 480 may receive the response, thereby acquiring the identification information of the identification device 500.

The building management robot 400 may detect the position (or the direction) of the recognized identification device 500 and recognize a person located at a position corresponding to the detected position (S110).

As described above with reference to FIG. 5, the building management robot 400 may include at least two short-range wireless communication modules spaced apart from each other. In this case, the processor 480 may detect the position or direction of the identification device 500 based on a difference in time or intensity between the responses received from the at least two short-range wireless communication modules.

The processor 480 may control the traveling unit 462 such that the detected position or direction is directed to the camera 442. Alternatively, if a separate camera direction adjustment mechanism for adjusting the direction of the camera 442 is provided in the building management robot 400, the processor 480 may control the camera direction adjustment mechanism such that the camera 442 is directed to the detected position or direction.

The processor 480 may acquire image data including the detected position or direction using the camera 442. In general, since the identification device 500 is moved in a state of being held by a person such as the owner of the identification device 500, the acquired image data may include an image including the face of the person who holds the identification device 500.

The processor 480 may recognize the person corresponding to the identification device 500 from the acquired image data. For example, the processor 480 may recognize the person from the image data using a known face recognition algorithm.

In some embodiments, the processor 480 may acquire voice data including the voice of the person, which is generated from the detected position or direction using the microphone 444. The processor 480 may recognize the person based on voice characteristics (frequency characteristics, etc.) of the acquired voice data. In this case, the microphone 444 may be implemented as a directional microphone, without being limited thereto.

In some embodiments, the processor 480 may recognize the person from the image data and/or the voice data using a recognition model stored in the memory 470. The recognition model may include an artificial neural network learned based on machine learning. The recognition model may be learned by the learning processor 430 of the building management robot 400 or the learning processor 230 of the server 200a.

The result of recognizing the person may include feature data of the person extracted from the image data and/or the voice data. For example, the feature data may include unique feature points extracted from the shape, color, voice, etc. of the face of the person. Hereinafter, assume that the feature data includes image feature data acquired from the image data and/or voice feature data acquired from the voice data.

Although not shown, the processor 480 may recognize that the identification device 500 is lost, when only the identification device 500 is recognized, presence of a person is not recognized from image data and the identification device 500 is not moved for a predetermined time or more. In this case, the processor 480 may collect the identification device 500, transmit a notification to the PC of the security office, or transmit a notification to the terminal of the person registered with respect to the identification device 500.

The building management robot 400 may store the recognized identification device 500 in the database to match the recognized person (S120).

The processor 480 may store the identification information acquired from the identification device 500 in the database to match the result of recognizing the person, thereby managing the person who uses the building.

For example, if the building is an apartment, the processor 480 may store the identification information (e.g., unit number information) acquired from the identification device 500 in the database to match feature data according to the result of recognizing the person.

The person recognized at a position corresponding to the identification device 500 may be a resident who resides in the divided space corresponding to the unit number of the identification device 500 or a person having a high degree of association with the unit number.

Therefore, the processor 480 may store the identification information of the identification device 500 in the database to match the feature data of the recognized data, for efficient management of the person. Meanwhile, when the identification information and the feature data are prestored in the database to match each other, the processor 480 may provide a service based on the authentication level of the recognized person as in the embodiment described below with reference to FIG. 9.

In some embodiments, two or more persons may be recognized at the position corresponding to the identification device 500. In this case, the processor 480 may store the identification information of the identification device 500 in the database to match the feature data of each of the recognized persons.

Meanwhile, the building management robot 400 may cumulatively acquire the result of recognition, by continuously performing steps S100 to S110. The building management robot 400 may set the authentication level of the recognized person based on the cumulated authentication level of the recognized person (S130).

The recognized person matching the identification device 500 is a person who is authorized to enter or use the divided space corresponding to the identification device 500 or a person registered with respect to the divided space (e.g., a resident, a guest, an employee, etc.) without being limited thereto and may be a person who is not authorized to enter or use the divided space, such as a simple one-time visitor.

The building management robot 400 may differentiate the service provided to the person matching the identification device 500, by setting the authentication level of the recognized person. For example, as the authentication level increases, the likelihood that the person is authorized to enter or use the divided space corresponding to the identification device 500 may increase. That is, the building management robot 400 may recognize that the likelihood that the person is a resident corresponding to a specific unit number increases as the authentication level of the recognized person increases.

Based on this, as the number of times of recognizing the person along with the identification device 500 increases, the likelihood that the person is authorized to enter or use the divided space or is registered with respect to the divided space increases.

Accordingly, the processor 480 may increase the authentication level as the number of recognizing the person along with the identification device 500 increases or when the number of times of recognizing the person is equal to or greater than a predetermined value.

Meanwhile, at least one of steps S110 to S130 may be performed by the server 200_a_. In this case, the building management apparatus 400 may transmit the information and data acquired by the communication unit 410, the camera 442 and/or the microphone 444 to the server 200_a_, in order for the server 200_a_ to perform steps S110 to S130.

Figure 7:
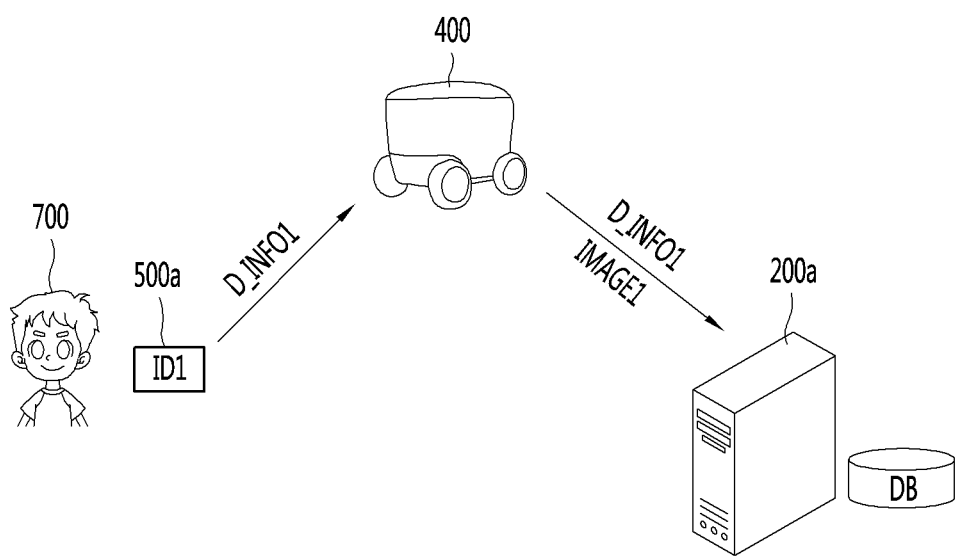
FIGS. 7 to 8 are diagrams showing examples related to authentication level management of the building management robot shown in FIG. 6.
Figure 8:
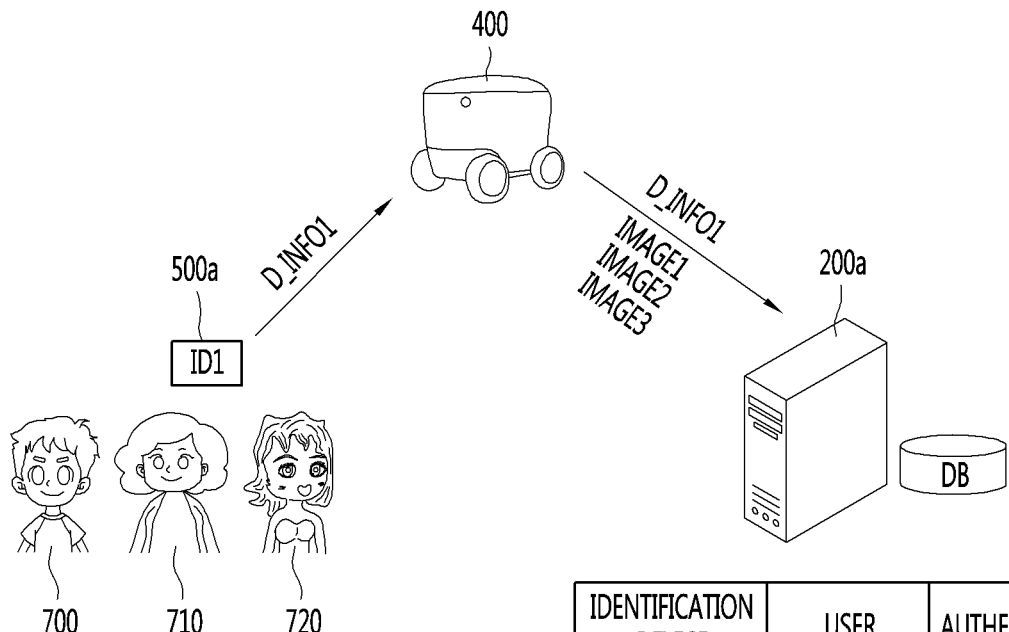

FIGS. 7 to 8 are diagrams showing examples related to authentication level management of the building management robot shown in FIG. 6.

Referring to FIG. 7, the building management robot 400 may detect a first identification device 500_a_ located within a predetermined distance and acquire first identification information D_INFO1 from the first identification device 550_a_.

The building management robot 400 may detect the position or direction of the first identification device 500_a_ and acquire image data of the detected position or direction using the camera 442. The image data may include the image of a first user 700 holding the first identification device 500_a_.

The building management robot 400 may acquire first image feature IMAGE1 of the first user 700 from the acquired image data. For example, the processor 480 may extract the facial area of the first user 700 from the acquired image data and acquire the first image feature IMAGE1 from the image data of the extracted area.

The building management robot 400 may transmit the acquired first identification information D_INFO1 and the first image feature data IMAGE1 of the first user 700 to the server 200_a_.

The server 200_a_ may register the first user 700 to match the first identification device 500_a_, by adding a record RECORD1 including the received first identification information D_INFO1 and the first image feature data IMAGE1 to the database.

In some embodiments, the building management robot 400 may transmit the acquired image data to the server 200_a_ instead of the first image feature data IMAGE1. The server 200_a_ may acquire the first image feature IMAGE1 from the image data and may add a first record RECORD1 including the acquired first image feature IMAGE1 and the first identification information D_INFO1 to the database.

Meanwhile, the server 200_a_ may set the authentication level of the first user 700 with respect to the first identification information D_INFO1. As described above, the server 200_a_ may increase the authentication level as the number of times of recognizing the first identification device 500_a_ and the first user 700 together, that is, the number of times of acquiring the first identification information D_INFO1 and the first image feature IMAGE1 together, increases.

Alternatively, when only the first user 700 is recognized with respect to the first identification device 500_a_, the first user 700 may be regarded as a person who holds the first identification device 500_a_ and a person who is registered or authorized to enter or use the divided space (the unit number of the apartment) corresponding to the first identification device 500_a_. Accordingly, the server 200_a_ may set the authentication level of the first user 700 to a high level.

Meanwhile, referring to FIG. 8, the building management robot 400 may detect the position or direction of the first identification device 500_a_ and acquire the image data of the detected position or direction using the camera 442. At this time, when a plurality of users 700, 710 and 720 are present at the position of the first identification device 500_a_, the image data may include the images of the users 700, 710 and 720.

The building management robot 400 may acquire the image feature data of each of the plurality of users from the acquired image data. For example, the processor 480 may extract the first image feature IMAGE1 corresponding to the first user 700, second image feature data IMAGE2 corresponding to the second user 710 and third image feature data IMAGE3 corresponding to the third user 720.

The building management robot 400 may transmit the acquired first identification information D_INFO1 and the plurality of acquired image feature data IMAGE1, IMAGE2 and IMAGE3 to the server 200*a*.

The server 200*a* may add a first record RECORD1 including the first identification information D_INFO1 and the first image feature IMAGE1 to the database, based on the received first identification information D_INFO1 and the image feature data IMAGE1, IMAGE2 and IMAGE3. However, if the first record RECORD1 is already present in the database, the server 200*a* may update the authentication level of the first record RECORD1 or update other items (recent authentication date, etc.) which may be included in the first record RECORD1.

In addition, the server 200*a* may register the second user 710 and the third user 720 to match the first identification device 500*a*, by adding a second record RECORD2 including the first identification information D_INFO1 and the second image feature data IMAGE2 and a third record RECORD3 including the first identification information D_INFO1 and the third image feature data IMAGE3 to the database.

The server 200*a* may set the authentication levels of the users 700, 710 and 720 with respect to the first identification information D_INFO1. For example, when the number of times of recognizing the first user 700 and the first identification device 500*a* is equal to or greater than a predetermined value, the server 200*a* may increase the authentication level of the first user 700 (e.g., LEVEL 3).

In contrast, when the number of times of recognizing the second user 710 along with the first identification device 500*a* and the number of times of recognizing the third user 720 along with the first identification device 500*a* are less than a predetermined value, it is difficult to determine whether each of the second user 710 and the third user 720 is authorized to enter or use the divided space corresponding to the first identification device 500*a* (e.g., whether the user is a resident of a specific unit number or a simple visitor). Therefore, the server 200*a* may set the authentication level of each of the second user 710 and the third user 720 to a low level (e.g., LEVEL 1) and increase the authentication level when the number of times of recognizing the second user 710 or the third user 720 along with the first identification device 500*a* increases.

That is, according to the embodiment shown in FIGS. 6 to 8, the building management robot 400 and the building management system including the same may register and manage the persons recognized at the inside/outside of the building to match the divided spaces in the building. In addition, the building management robot 400 and the building management system may set the authentication levels of the matched persons with respect to a specific divided space, thereby efficiently dividing and managing persons who are authorized to enter or use the specific divided space and persons who are not authorized to enter or use the specific divided space.

Figure 9:
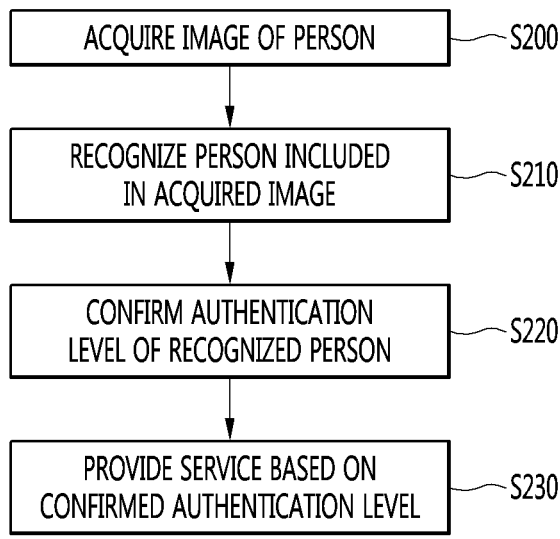
FIG. 9 is a flowchart illustrating operation of providing a service based on the authentication level of a recognized person at a building management robot according to an embodiment of the present invention.

FIG. 9 is a flowchart illustrating operation of providing a service based on the authentication level of a recognized person at a building management robot according to an embodiment of the present invention.

Referring to FIG. 9, the building management robot 400 may acquire the image of the person (S200) and recognize the person included in the acquired image (S210).

Steps S200 and S210 are similar to step S110 of FIG. 6 and a description thereof will be omitted.

In some embodiments, the processor 480 may acquire the voice data of the person using the microphone 444 and recognize the person based on the acquired voice data.

The building management robot 400 may confirm the authentication level of the recognized person (S220) and provide a service based on the confirmed authentication level (S230).

For example, the processor 480 may acquire a record having the feature data (image feature data and/or voice feature data) of the recognized person from the database. The processor 480 may confirm the authentication level of the recognized person based on the authentication level included in the acquired record.

In some embodiments, when there is a plurality of records having the feature data, the processor 480 may regard a highest authentication level among the authentication levels respectively included in the plurality of records as the authentication level of the recognized person.

The processor 480 may provide a service to the recognized person based on the confirmed authentication level. That is, the types or characteristics of the service provided by the building management robot 400 may differ between the authentication levels.

For example, assume that a first user having a relatively high authentication level and a second user having a relatively low authentication level are present. In this case, the building management robot 400 may provide more various services to the first user than the second user.

For example, when a user having an authentication level less than a reference level is recognized, the building management robot 400 may not provide services related to entry into the building or the divided space, such as simple greeting provision, security office calling, calling for a visit to a specific divided space, etc. In contrast, when a user having an authentication level higher than the reference level is recognized, the building management robot 400 may provide a personalized service, such as opening of the entrance of the building, escort, calling of an elevator, opening of the door of a specific divided space, etc.

Examples related thereto will be described with reference to FIGS. 10 to 11.

Figure 10:
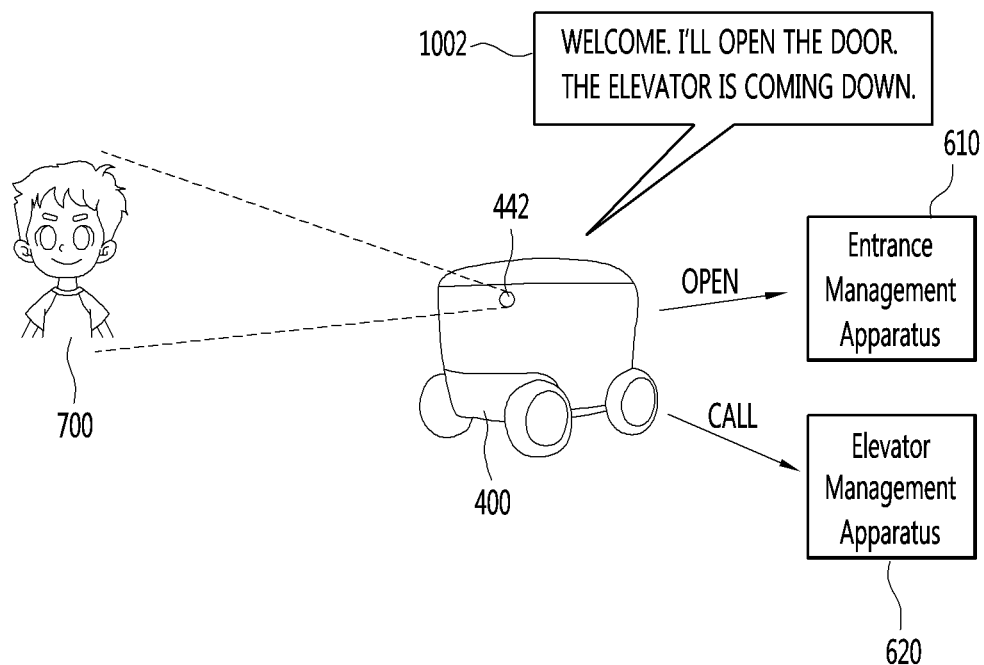
FIGS. 10 to 11 are diagrams showing examples of operation of providing different services according to the authentication level at the building management robot shown in FIG. 9.
Figure 11:
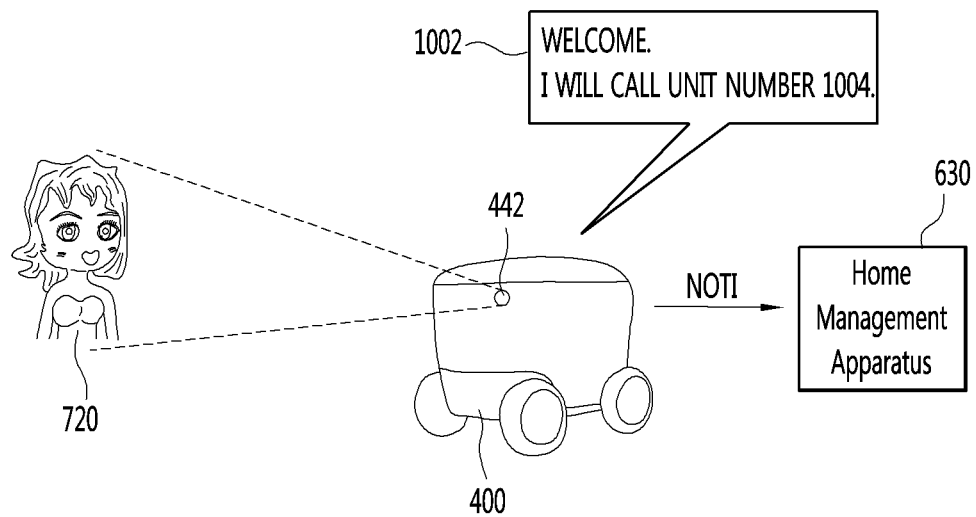

FIGS. 10 to 11 are diagrams showing examples of operation of providing different services according to the authentication level at the building management robot shown in FIG. 9.

Referring to FIG. 10, the building management robot 400 may acquire an image including the first user 700 using the camera 442 and recognize the first user 700 from the acquired image. For example, the building management robot 400 may recognize the first user 700 who tries to enter the building.

When the first user 700 holds the first identification device 500*a*, the building management robot 400 may recognize the first identification information of the first identification device 500*a* and the first user 700. In contrast, when the first user 700 does not hold the first identification device 500*a*, the building management robot 400 may recognize only the first user 700.

The building management robot 400 may acquire the record (identification information, authentication level, etc.) corresponding to the recognized first user 700 from the database.

When the acquired authentication level of the first user 700 is equal to or greater than a reference level, the building management robot 400 may provide the first user 700 with a personalized service, such as opening of the entrance of the building, escort, calling of an elevator, opening of the door of a specific divided space, etc. That is, the reference level may correspond to a criterion for determining whether the person is authorized to enter or use a specific divided space.

In some embodiments, there may be a plurality of reference levels. In this case, the provided service may be subdivided according to the authentication level.

For example, the building management robot 400 may transmit an entrance opening request signal OPEN to the entrance management apparatus 610. The entrance management apparatus 610 may open the entrance of the building when the signal OPEN is received. The first user 700 may enter the building as the entrance is opened.

In addition, the building management robot 400 may transmit an elevator call signal CALL to the elevator management apparatus 620, in order for the first user 700 to use the elevator. The elevator management apparatus 620 may move the elevator to a floor, on which the first user 700 and the building management robot 400 are located, based on the received signal CALL.

In some embodiments, the building management robot 400 may output a message 1002 related to the provided service through the output unit 450.

In addition, the building management robot 400 may acquire information (floor, unit number, room number, etc.) of the divided space corresponding to the first user 700 from the identification information of the identification device 500 matching the first user 700. The building management robot 400 may transmit information on a floor, to which the elevator will move after the first user 700 rides therein, to the elevator management apparatus 620 based on the acquired information. The elevator management apparatus 620 may move the elevator to the corresponding floor based on the received information.

Although not shown, the building management robot 400 may ride in and get off the elevator along with the first user 700 and escort the first user 700 to the entrance (the door, etc.) of the divided space corresponding to the first user 700.

Meanwhile, referring to FIG. 11, the building management robot 400 may acquire an image including the third user 720 using the camera 442 and recognize the third user 720 from the acquired image. For example, the building management robot 400 may recognize the third user 720 who tries to enter the building.

The building management robot 400 may acquire a record (identification information, authentication level, etc.) corresponding to the recognized third user 720 from the database.

When the acquired authentication level of the third user 720 is less than a reference level, the building management robot 400 may determine that the third user 720 is a person (e.g., a visitor) who not authorized to enter or use a specific divided space. Therefore, the building management robot 400 may not provide a service such as entrance opening or elevator calling shown in FIG. 10.

For example, the building management robot 400 may transmit a visitor notification NOTI to the management apparatus 630 of the divided space corresponding to the third user 720. In some embodiments, the building management robot 400 may output a message 1102 related to the provided service through the output unit 450.

Although not shown, the building management robot 400 may also transmit image data including the third user 720 to the management apparatus 630 when transmitting the visitor notification NOTI.

In addition, when image and/or voice data for communication with the third user 720 is received from the management apparatus 630, the building management robot 400 may output the received image and/or voice data through the output unit 450. That is, the building management robot 400 enables communication between an occupant (a resident, etc.) of the divided space and the third user 720. In some embodiments, when entry of the third user 720 is approved by the occupant, the building management robot 400 may provide the third user 720 with a service such as entrance opening or elevator calling as shown in FIG. 10.

Meanwhile, operations other than operation of acquiring the image of the user 700 and operation of outputting a message and image and/or voice data among operations of the building management robot 400 shown in FIGS. 9 to 11 may be performed by the server 200*a*.

That is, according to the embodiment shown in FIGS. 10 to 11, the building management robot 400 may provide different services based on the authentication level of the recognized user. In particular, although the user does not hold the identification device 500 corresponding to the specific divided space, the building management robot 400 may smoothly provide a service to the user using the database in which information related to the user is stored.

Figure 12:
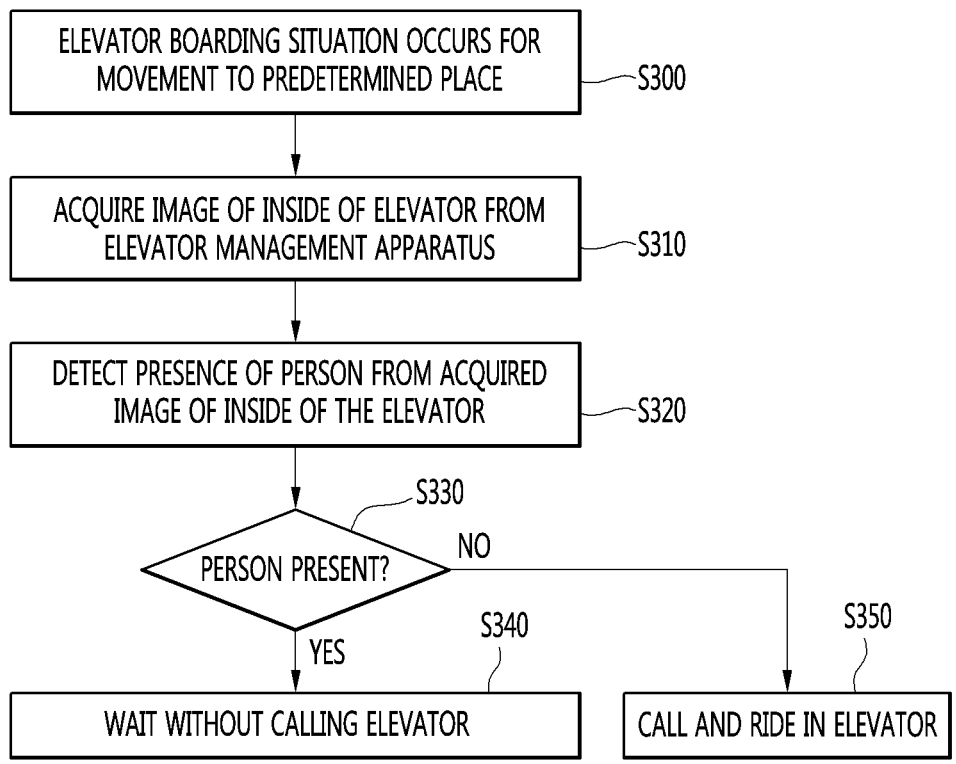
FIG. 12 is a flowchart illustrating an embodiment of a method of using an elevator of a building management robot.

FIG. 12 is a flowchart illustrating an embodiment of a method of using an elevator of a building management robot.

Referring to FIG. 12, the building management robot 400 may recognize that a boarding situation of the elevator provided in the building occurs (S300), for movement to a predetermined place located in the building.

For example, when a visit request is received from the management apparatus (e.g., the home management apparatus 630) of the specific divided space, the processor 480 may recognize that the robot needs to ride in the elevator for movement to the specific divided space.

The building management robot 400 may acquire the image of the inside of the elevator from the elevator management apparatus 620 (S310), and detect whether a person is present from the acquired image of the inside of the elevator (S320).

The elevator management apparatus 620 may periodically or continuously acquire image data using the camera device (CCTV, etc.) provided in the elevator. The acquired image data may be transmitted to and stored in the server 200*a*.

The processor 480 of the building management robot 400 may acquire the image data of the inside of the elevator from the elevator management apparatus 620 or the server 200*a*, when an elevator boarding situation has occurred.

The processor 480 may detect whether a person (user) is present in the elevator from the acquired image data. For example, the processor 480 may recognize whether a person is present from the image data using a known image recognition algorithm. In some embodiments, operation of recognizing presence of person may be performed by the server 200*a*.

Upon detecting that a person is present in the elevator (YES of S330), the building management robot 400 may wait until the person gets off the elevator without calling the elevator (S340).

In contrast, upon detecting that a person is not present in the elevator (NO of S330), the building management robot 400 may call and ride in the elevator (S350).

When a user which is using the elevator is present, if the elevator is stopped by the building management robot 400 on a specific floor, movement of the user may be delayed.

Alternatively, since the building management robot 400 includes the camera 442 or the microphone 444, the user may dislike use of the elevator with the building management robot 400 in terms of privacy.

That is, the building management robot 400 may use the elevator to minimize disturbance or discomfort of other users of the elevator.

When a person is present in the elevator, the processor 480 may wait until the person gets off the elevator without transmitting a request for calling the elevator to the elevator management apparatus 620.

When the person has gotten off the elevator and thus no person is present in the elevator, the processor 480 may transmit the request for calling the elevator to the elevator management apparatus 620. When the elevator arrives at a floor where the building management robot 400 and the door is opened, the processor 480 may control the traveling unit 462 such that the robot rides in the elevator. The processor 480 may transmit a request for movement to the floor of the specific divided space to the elevator management apparatus 620 after the robot rides in the elevator. The elevator management apparatus 620 may move the elevator to the floor of the specific divided space in response to the request for movement.

In some embodiments, the building management robot 400 may wait without calling the elevator when a predetermined number of persons or more is present in the elevator. In addition, the building management robot 400 may call and ride in the elevator when less than the predetermined number of persons is present in the elevator.

Alternatively, the building management robot 400 may monitor whether the number of persons present in the elevator is changed after calling the elevator and before riding in the elevator, and cancel calling of the elevator when other persons ride in the elevator or the number of persons increases to the predetermined number of persons or more while the elevator moves according to calling of the elevator.

Figure 13:
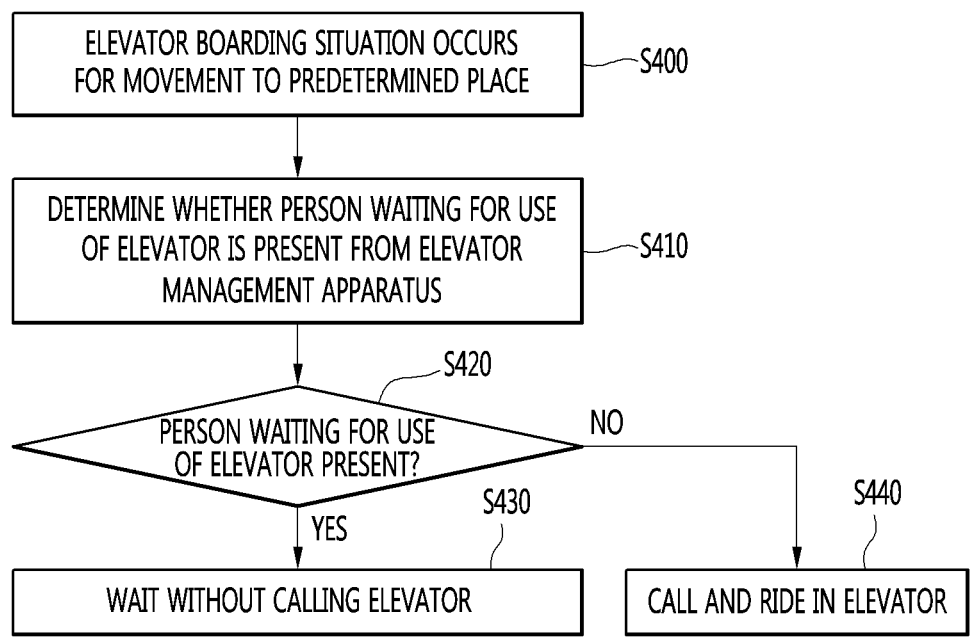
FIG. 13 is a flowchart illustrating another embodiment of a method of using an elevator of a building management robot.

FIG. 13 is a flowchart illustrating another embodiment of a method of using an elevator of a building management robot.

Step S400 of FIG. 13 is substantially equal to S300 of FIG. 12.

The building management robot 400 may determine whether a person waiting for use of the elevator is present from the elevator management apparatus 620 (S410).

For example, a camera device (CCTV, etc.) disposed to face an elevator boarding area may be provided on each floor of the building. The elevator management apparatus 620 or the server 200a may acquire image data from the camera devices and transmit the acquired image data to the building management robot 400.

The processor 480 (or the server 200a) may recognize whether a person is present from the acquired image data using the known image recognition algorithm, thereby determining whether a person waiting for use of the elevator is present.

Upon determining that the person waiting for use of the elevator is present (YES of S420), the building management robot 400 may wait without calling the elevator (S430).

In contrast, upon determining that the person waiting for use of the elevator is not present (NO of S420), the building management robot 400 may call and ride in the elevator (S440).

When a person waiting for use of the elevator is present on a specific floor, the processor 480 may wait until use of the elevator by the person waiting for use of the elevator is finished without transmitting a request for calling the elevator to the elevator management apparatus 620.

When the person waiting for use of the elevator is not present, the processor 480 may transmit the request for calling the elevator to the elevator management apparatus 620. When the elevator arrives at a floor where the building management robot 400 is located and the door is opened, the processor 480 may control the traveling unit 462 such that the robot rides in the elevator. The processor 480 may transmit, to the elevator management apparatus 620, a request for movement to the specific divided space after riding in the elevator. The elevator management apparatus 620 may move the elevator to the floor of the specific divided space in response to the request for movement.

That is, according to the embodiments shown in FIGS. 12 to 13, the building management robot 400 may use the elevator only when the user of the elevator or the person waiting for use of the elevator is not detected, thereby minimizing disturbance or inconvenience of the user of the elevator or the person waiting for use of the elevator.

Figure 14:
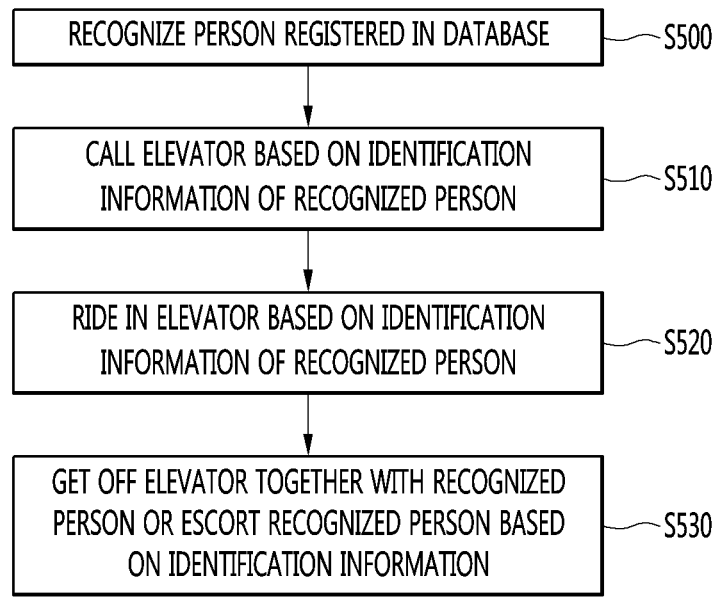
FIG. 14 is a flowchart illustrating an embodiment of operation of providing an elevator related service based on identification information of a recognized person at a building management robot.
Figure 15:
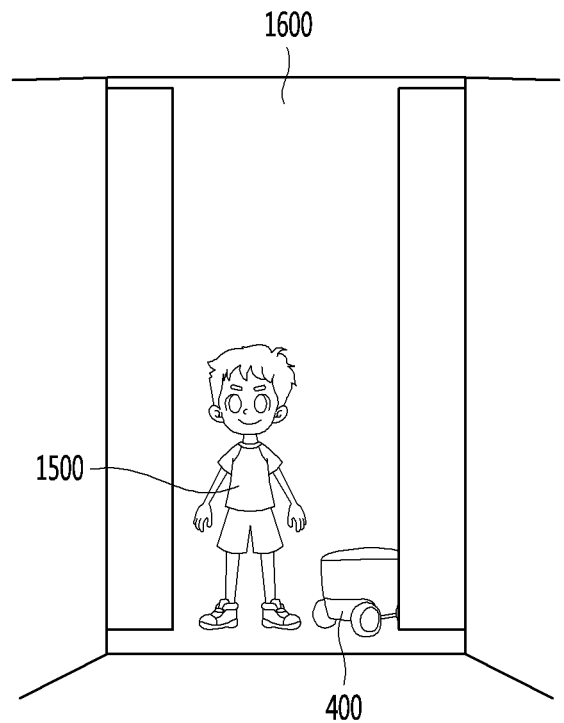
FIG. 15 is a diagram showing an example of elevator related service provision operation of the building management robot shown in FIG. 14.

FIG. 14 is a flowchart illustrating an embodiment of operation of providing an elevator related service based on identification information of a recognized person at a building management robot. FIG. 15 is a diagram showing an example of elevator related service provision operation of the building management robot shown in FIG. 14.

Referring to FIG. 14, the building management robot 400 may recognize a person registered in the database (S500). The building management robot 400 may call the elevator based on the identification information of the divided space or the identification device 500 corresponding to the recognized person (S510).

As described above with reference to FIGS. 6 and 9, the processor 480 may recognize the person using the image data and/or the voice data acquired through the camera 442 and/or the microphone 444, and acquire the identification information corresponding to the identification device (or the divided space) corresponding to the recognized person from the database.

The processor 480 may confirm a floor, to which the recognized person will move, from the acquired identification information and transmit a request for calling the elevator to the elevator management apparatus 620 according to the result of confirmation. In some embodiments, the processor 480 may confirm the authentication level of the recognized person and transmit a request for calling the elevator to the elevator management apparatus 620 when the confirmed authentication level is equal to or greater than a reference level.

The building management robot 400 may ride in the elevator based on the identification information of the recognized information (S520), and get off the elevator when the person gets off the elevator to escort the person (530).

The identification information of steps S520 and S530 may not mean the identification information of the identification device 500 or the divided space, but may mean information indicating the characteristics (gender, age range, disability and impaired mobility, etc.) of the person capable of being acquired from the feature data of the recognized person. In this case, not only the identification information of the identification device 500 or the divided space but also the identification information indicating the characteristics of the person may be stored in the database.

Referring to FIG. 15 together, for example, when the age range of the recognized person is less than a predetermined age range (e.g., a child 1500) or greater than a predetermined age range (e.g., an elderly person), the processor 480 may control the traveling unit 462 to ride in and get off the elevator 1600 together with the recognized person 1500. The processor 480 may acquire image data including the recognized person 1500 using the camera 442 after the robot gets off the elevator, thereby monitoring whether the person 1500 normally moves.

In some embodiments, the processor 480 may control the traveling unit 462 such that the robot travels according to movement of the recognized person 1500 after getting off the elevator 1600, thereby escorting the recognized person 1500.

Figure 16:
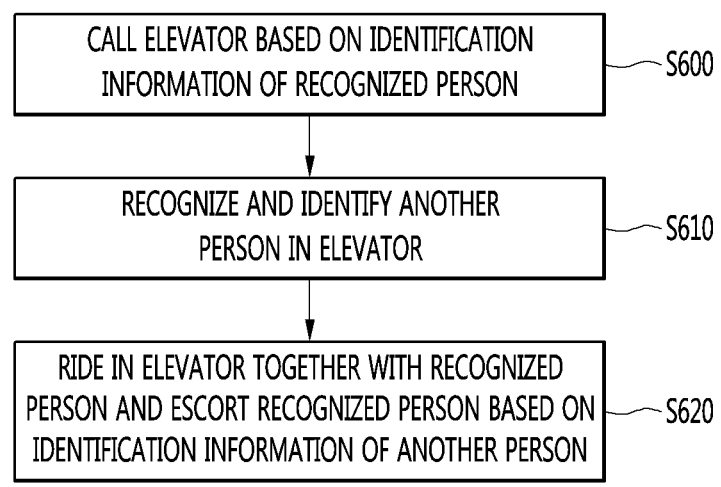
FIG. 16 is a flowchart illustrating an embodiment of operation of providing an elevator related service to a recognized person based on a result of identifying another person in an elevator at a building management robot.

FIG. 16 is a flowchart illustrating an embodiment of operation of providing an elevator related service to a recognized person based on a result of identifying another person in an elevator at a building management robot.

Referring to FIG. 16, the building management robot 400 may call the elevator based on the identification information of the recognized person (S600).

Step S600 may be substantially equal to step S510 of FIG. 14.

When the other person is present in the called elevator, the building management robot 400 may recognize and identify the other person (S610).

When the entrance of the elevator is opened, the processor 480 may acquire image data including the inside of the elevator using the camera 442. Alternatively, the processor 480 may receive the image data acquired from the camera device (CCTV, etc.) provided in the elevator from the elevator management apparatus 620.

The processor 480 may recognize whether the other person is present in the elevator from the acquired image data or the received image data.

When the other person is present, the processor 480 may recognize and identify the other person. The processor 480 may acquire feature data from the image of the other person and recognize and identify the other person depending on whether the acquired feature data is present in the database.

The building management robot 400 may ride in the elevator together with the person recognized in step S600 to escort the recognized person based on the result of identifying the other person (S620).

For example, when the other person has been registered in the database (or the authentication level of the other person is equal to or greater than a reference level), the processor 480 may not ride in the elevator together with the recognized person. When the other person has been registered in the database, the other person may be authorized to enter or use the same or different divided space as the person recognized in step S600. Accordingly, the processor 480 may recognize that security of the recognized person is guaranteed and thus the robot may not ride in the elevator.

In contrast, when the other person has not been registered in the database (or the authentication level of the other person is less than the reference level), the processor 480 may ride in and get off the elevator together with the recognized person and escort the recognized person. The other person who has not been registered in the database may be a person (a simple visitor, a high-risk person, etc.) who is not authorized to enter or use the divided spaces of the building. Accordingly, the processor 480 may ride in and get off the elevator together with the recognized person and provide an escort service to a destination, for safety of the recognized person.

That is, according to the embodiments shown in FIGS. 14 to 16, the building management robot 400 may provide a service for riding in the elevator together with the user and escorting the user based on the characteristics of the user of the elevator or the result of identifying the other person present in the elevator. Therefore, the building management robot 400 enables the user to safely use the elevator and enables the user to feel satisfaction with the building management robot.

According to the embodiment of the present invention, the building management robot can efficiently manage persons recognized at the inside/outside of a building to match divided spaces in the building. In addition, the building management robot may set the authentication levels of the matched persons with respect to a specific divided space, thereby efficiently dividing and managing persons who are authorized to enter or use the specific divided space and persons who are not authorized to enter or use the specific divided space.

In addition, the building management robot can automatically provide various customized services to persons, by providing different services based on the respective authentication levels of recognized persons.

In addition, the building management robot can minimize disturbance or inconvenience of a user of an elevator or a person waiting for use of the elevator, by using the elevator only when the user of the elevator or the person waiting for use of the elevator is not detected in the case where the robot needs to ride in the elevator.

In addition, the building management robot may provide a service for riding in the elevator together with the user and escorting the user based on the characteristics of the user of the elevator or the result of identifying another person present in the elevator. Therefore, the building management robot can enable the user to safely use the elevator and enable the user to feel satisfaction with the building management robot.

The foregoing description is merely illustrative of the technical idea of the present invention, and various changes and modifications may be made by those skilled in the art without departing from the essential characteristics of the present invention.

Therefore, the embodiments disclosed in the present invention are to be construed as illustrative and not restrictive, and the scope of the technical idea of the present invention is not limited by these embodiments.

The scope of the present invention should be construed according to the following claims, and all technical ideas within equivalency range of the appended claims should be construed as being included in the scope of the present invention.

What is claimed is:

1. A building management robot comprising:
   a communication unit configured to recognize an identification device corresponding to a first divided space among at least one divided space in a building and acquire first identification information of the first divided space from the identification device;
   a memory configured to store a recognition model;
   a camera configured to acquire image data including a position where the identification device is recognized; and
   a processor configured to:
   recognize a user from the image data based on the recognition model stored in the memory;
   confirm an authentication level of the first divided space of the recognized user from a database;
   transmit a visitor notification to a management apparatus of the first divided space, when the authentication level is less than a reference level; and
   transmit a request for opening an entrance of the building to an entrance management apparatus or a request for calling an elevator to an elevator management apparatus of the building, when the authentication level is equal to or greater than the reference level.

2. The building management robot according to claim 1, wherein the communication unit includes at least two wireless communication modules spaced apart from in the building management robot, and
wherein the processor:
detects a position or direction of the identification device based on a difference in intensity or time between signals respectively received from the identification device through the at least two wireless communication modules,
controls a traveling unit or a camera direction adjustment mechanism to face the detected position or direction, and
controls the camera to acquire the image data.

3. The building management robot according to claim 1, wherein the processor:
extracts an area including the user from the image data,
acquires image feature data of the user from the extracted area, and
acquires the authentication level included in a record having the image feature data and the first identification information of the first divided space from the database.

4. The building management robot according to claim 1, wherein the processor stores a first record including feature data of the user acquired from the image data, the first identification information of the first divided space and the authentication level in the database, when information on the user matching the first divided space is not present in the database.

5. The building management robot according to claim 4, wherein the processor increases the authentication level included in the first record, when the number of times of acquiring the first identification information and the feature data of the user is equal to or greater than predetermined value.

6. The building management robot according to claim 1, wherein the processor:
recognizes an elevator boarding situation for movement to a second divided space among the at least one divided space,
receives first image data including the inside of an elevator from an elevator management apparatus or a server,
detects whether a person riding in the elevator is present from the received first image data, and
transmits a request for calling the elevator to the elevator management apparatus or the server when the person riding in the elevator is not present.

7. The building management robot according to claim 6, wherein the processor:
receives at least one second image data including an elevator boarding area of at least one floor in the building from the elevator management apparatus or the server,
detects whether a person waiting for use of the elevator is present from the received at least one second image data, and
transmits a request for calling the elevator to the elevator management apparatus or the server when the person waiting for use of the elevator is not present.

8. The building management robot according to claim 1, wherein the processor:
transmits a request for calling an elevator to an elevator management apparatus or a server based on the first identification information, and
determines whether the robot rides in the elevator based on characteristics of the user, and
wherein the characteristics of the user include at least one of gender, age range, disability and impaired mobility.

9. The building management robot according to claim 8, wherein the processor:
controls a traveling unit such that the robot gets off the elevator together with the user when the robot rides in the elevator together with the user, and
performs at least one of first operation of controlling the camera to acquire image data including the user and second operation of controlling the traveling unit to travel according to movement of the user.

10. The building management robot according to claim 8, wherein the processor:
receives image data including the inside of the elevator from the elevator management apparatus or the server,
identifies another person in the elevator from the received image data, and
determines whether the robot rides in the elevator based on a result of identifying the other person.

11. A method of providing a service using a building management robot, the method comprising:
recognizing an identification device corresponding to a first divided space among at least one divided space in a building;
acquiring image data including a position where the identification device is recognized;
recognizing a user from the acquired image data based on a stored recognition model;
confirming an authentication level of the first divided space of the recognized user from a database;
transmitting a request for opening an entrance of the building to an entrance management apparatus; and
transmitting a request for calling an elevator to the elevator management apparatus of the building.

12. The method according to claim 11, further comprising adding a first record including feature data of the user acquired from the image data, the first identification information and the authentication level to the database, when information on the user matching the first divided space is not present in the database.

13. The method according to claim 12, further comprising increasing the authentication level when the number of times of acquiring the first identification information and the feature data of the user is equal to or greater than a predetermined value.

14. The method according to claim 11, further comprising:
calling an elevator to floor where the building management robot is located based on the first identification information, and
determining whether the building management robot rides in the elevator based on characteristics of the user,
wherein the characteristics of the user include at least one of gender, age range, disability and impaired mobility.

15. The method according to claim 14, further comprising:
performing control such that the building management robot gets off the elevator together with the user when the building management robot rides in the elevator together with the user, and
performing, by the building management robot, at least one of operation of acquiring image data including the user and operation of traveling according to movement of the user.

16. The method according to claim 14, further comprising:
- identifying another person present in the elevator from the image data including the inside of the elevator, and
- determining whether the building management robot rides in the elevator when the user rides in the elevator, based on a result of identifying the other person.

* * * * *